United States Patent [19]

Sweet

[11] Patent Number: 5,188,175
[45] Date of Patent: Feb. 23, 1993

[54] METHOD OF FRACTURING A SUBTERRANEAN FORMATION WITH A LIGHTWEIGHT PROPPING AGENT

[75] Inventor: Larrie Sweet, New Iberia, La.

[73] Assignee: Carbo Ceramics Inc., Dallas, Tex.

[21] Appl. No.: 769,584

[22] Filed: Oct. 2, 1991

Related U.S. Application Data

[63] Continuation of Ser. No. 393,598, Aug. 14, 1989, abandoned.

[51] Int. Cl.⁵ .......................................... E21B 43/267
[52] U.S. Cl. .................................... 166/280; 166/308; 252/8.551; 501/127
[58] Field of Search ................. 166/280, 308; 252/8.551; 501/127

[56] References Cited

U.S. PATENT DOCUMENTS

| | | |
|---|---|---|
| 2,950,247 | 8/1960 | McGuire, Jr. |
| 3,245,866 | 4/1966 | Schott. |
| 3,437,148 | 4/1969 | Colpoys, Jr. ..................... 166/308 |
| 3,976,138 | 8/1976 | Colpoys, Jr. ..................... 166/280 |
| 4,068,718 | 1/1978 | Cooke, Jr. ....................... 166/280 |
| 4,427,068 | 1/1984 | Fitzgibbon ....................... 166/280 |
| 4,440,866 | 4/1984 | Lunghofer. |
| 4,462,466 | 7/1984 | Kacknik ........................... 166/280 |
| 4,493,875 | 1/1955 | Beck et al. ....................... 428/403 |
| 4,522,731 | 6/1985 | Lunghofer ..................... 166/280 X |
| 4,547,468 | 10/1985 | Jones et al. .................... 166/280 X |
| 4,555,493 | 11/1985 | Watson et al. ................ 166/280 X |
| 4,623,630 | 11/1986 | Fitzgibbon ....................... 166/280 |
| 4,632,876 | 12/1986 | Laird et al. ....................... 428/404 |
| 4,639,427 | 1/1987 | Khaund ........................... 166/280 |
| 4,658,899 | 4/1987 | Fitzgibbon ....................... 166/280 |
| 4,668,645 | 5/1967 | Khaund ........................... 166/280 |
| 4,680,230 | 7/1987 | Gibb et al. ....................... 166/280 |
| 4,713,203 | 12/1987 | Andrews ....................... 501/131 X |
| 4,921,820 | 5/1990 | Rumpf et al. ................. 166/280 X |

FOREIGN PATENT DOCUMENTS

| | | |
|---|---|---|
| 0101855 | 3/1984 | European Pat. Off. |
| 0116369 | 8/1984 | European Pat. Off. |
| 0169412 | 1/1986 | European Pat. Off. |

OTHER PUBLICATIONS

"Light Weight Proppants for Deep Gas Well Stimulation", A. H. Jones et al, submitted by Terra Tek, Inc., Jun. 1980, Report TR 80–47.
"Determine Feasibility of Fabricating Light Weight Proppants for Application in Gas and Oil Well Stimulation", Progress Report 10, U.S. Dept. of Energy, submitted by Terra Tek, Inc., Report TR 80-77, Jul, 1980.
"Lightweight Proppants for Deep Gas Well Stimulation", by R. A. Cutler and A. H. Jones, Terra Tek Research, Report 81-108, Dec. 1981.
"Oxide Ceramic Proppants for Treatment of Deep Well Fractures", by E. A. Neel et al., SPE 6816 (1977).

Primary Examiner—George A. Suchfield
Attorney, Agent, or Firm—Pravel, Gambrell, Hewitt, Kimball & Krieger

[57] ABSTRACT

A lightweight propping agent made from kaolin clay or mixtures of kaolin clay and lightweight aggregate and having an alumina content between 25% and 40%, a specific gravity of from 2.20 to 2.60 and better conductivity than sand at pressures up to 8,000 psi.

4 Claims, 3 Drawing Sheets

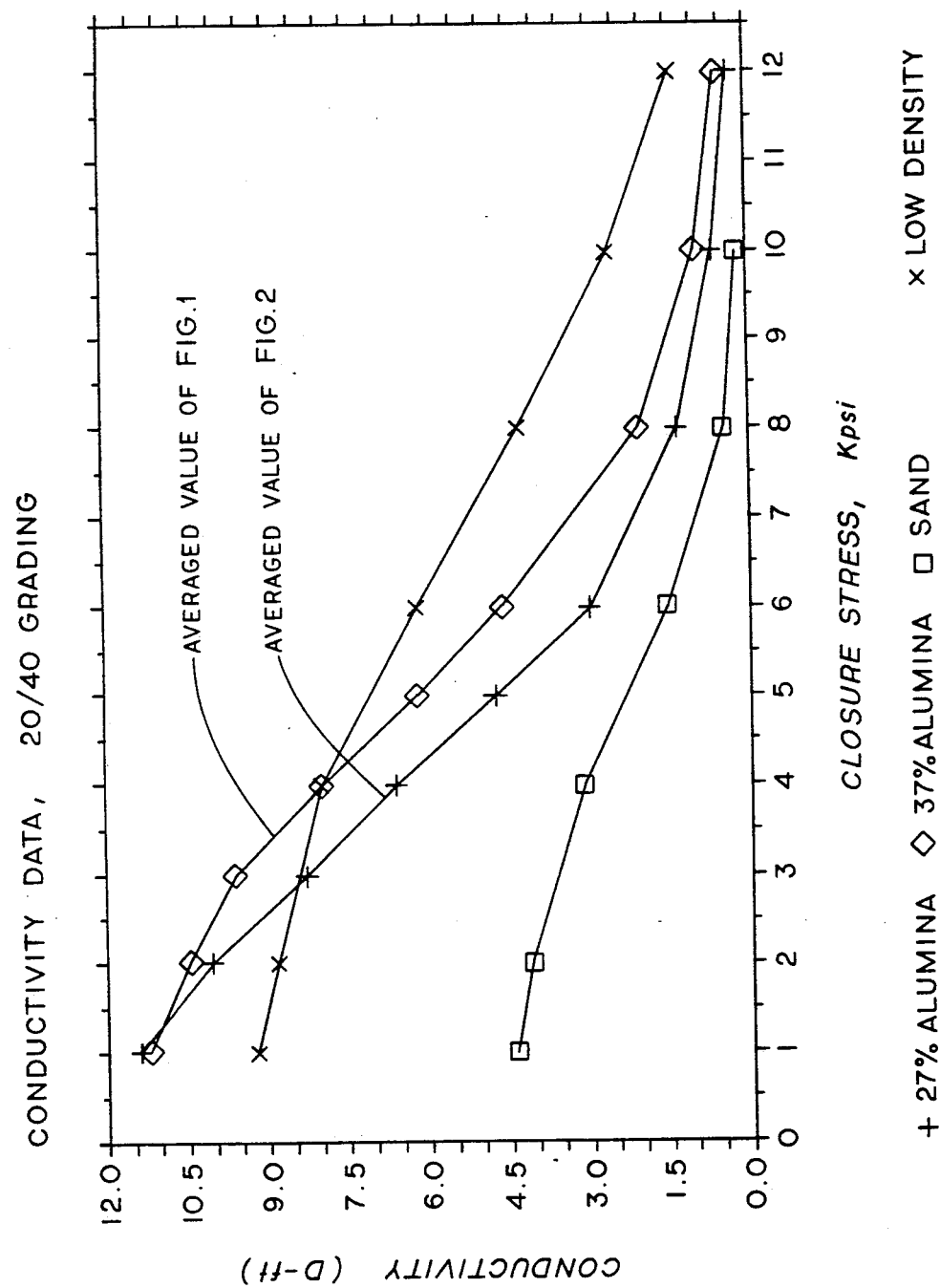

METHOD OF FRACTURING A SUBTERRANEAN FORMATION WITH A LIGHTWEIGHT PROPPING AGENT

This is a continuation of co-pending application Ser. No. 07/393,598 filed on Aug. 14, 1989, now abandoned.

FIELD OF THE INVENTION

This invention is in the field of propping agents used to prop open fractures in subterranean formations around oil and gas wells. More particularly, it relates to the use of lightweight propping agents in fracturing operations.

BACKGROUND

In oil and gas wells, it frequently becomes necessary to stimulate product flow to attain economically feasible production rates. For example, a new well may have unacceptable production due to low permeability of the formation or damage around the wellbore. The technique frequently used to stimulate such a well is to pump a fluid into the well until the pressure increases to a level sufficient to fracture the formation which results in the creation of cracks in the formation. These cracks are capable of carrying product to the well at a significantly higher flow rate. This technique is called fracturing or hydraulic fracturing and has been practiced for about forty years.

It is also known that after the formation has been fractured, it is necessary to prop open the newly formed cracks to facilitate the continued flow of gas or oil. Otherwise, the cracks would close under the influence of overburden pressure. The technique used to prop the cracks open is to pump a slurry of fluid and solid particulate material into the fractured formation. The particulate material used can be of varying size and shape. However, it is known that spherical particles provide better permeability than irregularly shaped particles and that closely sized particles, e.g., 25-30 mesh, give better permeability than a wide range of particle sizes. The particles can consist of a variety of materials, such as sand, glass, alumina, bauxite or other materials. Whatever its structure or composition, the particulate material, called proppant or propping agent, must have sufficient strength to withstand the overburden pressure (closure stress) exerted upon the fracture. A common failure of a weak proppant is to disintegrate into fine particles which can clog the cracks created in the fracturing process. Since overburden pressure varies directly with depth, proppants used in deeper fractures are necessarily stronger than those which are suitable for shallower applications.

For depths up to about 5,000 feet, sand, which has a generally accepted specific gravity of 2.62, can be a satisfactory proppant, but its performance degenerates rapidly as depth increases. Sand has long been the most common proppant because of its price and availability. However, man-made proppants have become increasingly more popular, especially in deeper applications where the permeability of sand is inadequate. For comparison purposes, sand is an example of a low density/low strength proppant.

Sintered bauxite or high grade alumina is strong enough to maintain permeability even at well depths greater than 20,000 feet, but these high strength proppants have much higher densities, i.e., specific gravities above 3.6, and require high viscosity pumping fluids or high pumping rates. These high strength proppants require larger pumping equipment and cause accelerated wear rates in fluid carrying equipment. In addition, the high strength proppant is generally higher priced because of higher raw material costs. In addition, it is traditionally priced per unit weight, resulting in higher cost for a given volume of high density proppant. Sintered bauxite is an example of a high density/high strength proppant.

Because of the disadvantages associated with a high density proppant, the goal of the proppant industry has been to create a lower density proppant without sacrificing strength. Lower density proppants, e.g., specific gravity less than about 3.4, have been found to have sufficient strength to provide adequate permeability at intermediate depths and pressures, i.e., 7,000 to 14,000 feet (5,000-10,000 psi). U.S. Pat. No. 4,412,068 which issued to Fitzgibbon on Jan. 24, 1984 describes such an intermediate density/intermediate strength proppant. U.S. Pat. No. 4,522,731 which issued to Lunghofer on Jun. 11, 1985 describes a proppant having a specific gravity less than 3.0 and an alumina content of from 40% to 60%. This low density/intermediate strength proppant of Lunghofer also works well in the intermediate depth range of 7,000 to 14,000 feet. However, the raw materials used to make all these intermediate proppants still represent a significant part of the cost of manufacture primarily because of the alumina content of the ore. Additionally, since most fracturing operations are in the low depth range where sand is used, it is desirable to provide a lightweight proppant which can be produced from inexpensive, low alumina content, raw materials and which exhibits conductivity greater than sand when used in low depth applications.

SUMMARY OF THE INVENTION

This invention is a proppant which has a specific gravity less than natural quartz silicon dioxide, such as Ottawa sand, but exhibits conductivity greater than sand over a range of closure stress up to 8,000 psi. The proppant of this invention has a low specific gravity of between 2.20 and 2.60, which is less than sand, and it exhibits a conductivity greater than sand when subjected to a closure stress up to about 8,000 psi. Not only is this proppant less expensive per pound than high strength or intermediate strength proppants because of raw material costs, but fewer pounds are required for a given propping application because of the lower density. Another significant advantage of this lightweight proppant is the ability to use a lower viscosity pumping fluid, resulting in more economical pumping at lower pumping rates than those required with the use of heavier or denser proppants, even sand.

These advantages are achieved by forming solid spherical pellets or particles from raw materials having an alumina content of between 25% and 40% and a silica content of between 50% and 65%. One such raw material is kaolin clay. If the kaolin clay has a high enough alumina content, it can also be mixed with a lightweight aggregate composed largely of silicon dioxide and having an approximate alumina content of about 20% to obtain a mixture having an alumina content of between 25% to 40% alumina.

BRIEF DESCRIPTION OF THE DRAWINGS

FIG. 3 is a plot of conductivity versus closure stress for samples of the proppant of the present invention.

DESCRIPTION OF THE PREFERRED EMBODIMENT

Figure 1:
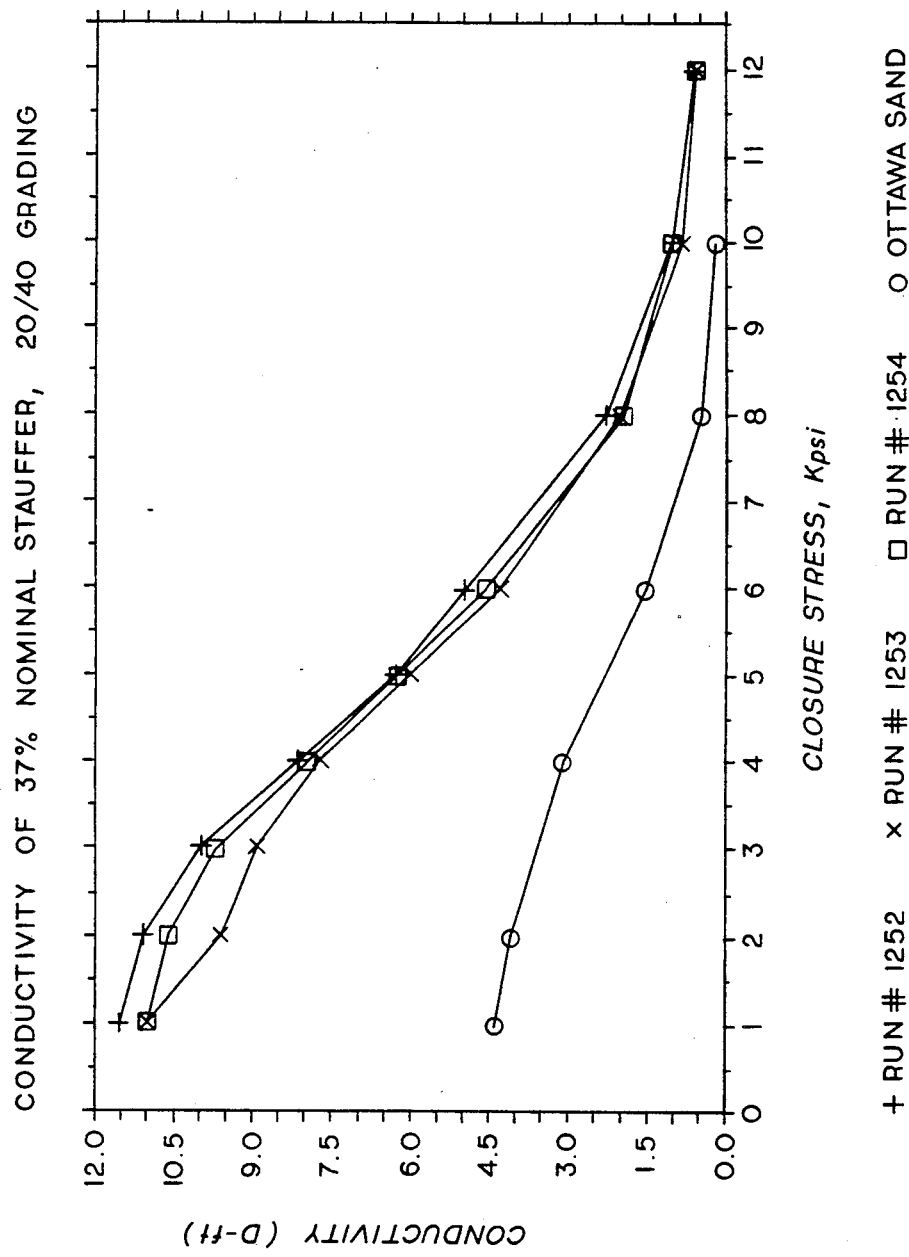
FIG. 1 is a plot of conductivity versus closure stress for samples of the proppant of the present invention.

The proppant of the present invention is in the form of solid, spherical pellets made from raw materials, such as kaolin clay or a mixture of kaolin clay and lightweight aggregate. The proppant has an alumina content of between 25% and 40% and an apparent specific gravity of between 2.20 and 2.60, which is less than sand. For the purposes of this invention, the term "sand" is used to refer to premium quality "Ottawa" sand having a 20/40 mesh size.

Kaolin clay generally has an alumina content less than about 50%, and a silica content greater than about 45%. Lightweight aggregate generally has an alumina content less than about 25% and a silica content greater than about 60%. All percentages are expressed herein on a dry weight, fully calcined basis.

The term "spherical" is used in this invention to refer to both roundness and sphericity and will designate pellets having an average ratio of minimum diameter to maximum diameter of about 0.7 or greater, or having an average roundness and sphericity value of about 0.7 or greater on the Krumbein and Sloss chart as determined by visually grading 10 to 20 randomly selected particles.

The term "apparent specific gravity" is a number generally written without units, but numerically equal to the weight in grams per cubic centimeter of volume, excluding void space or open porosity in determining the volume. The apparent specific gravity values given herein were determined by liquid (deionized water) displacement. The apparent specific gravity for a variety of proppants is given in Table I.

TABLE I

| Proppant Type | Apparent Specific Gravity |
|---|---|
| Lightweight | 2.20–2.60 |
| Resin Coated Sand | 2.5–2.6 |
| Sand | 2.62 |
| Low Density | 2.70–2.75 |
| Intermediate | 3.1–3.3 |
| High Density | 3.6–3.7 |

Another important physical characteristic of any proppant is its conductivity to fluids at various closure stresses. A conductivity test is routinely run on proppants to determine the decrease of fluid flow rate through the proppant sample as the pressure (or closure stress) on the proppant pack is increased. In the conductivity test, a measured amount of proppant, e.g., two pounds per sq. ft., is placed in a cell and a fluid (usually deionized water) is passed through the proppant pack at various flow rates. As pressure on the pack is increased, it causes the proppant to crush, thereby decreasing the flow capacity which is being measured. The conductivity of a proppant is one of the best indicators of its crush strength, and it provides valuable information about how the proppant will perform in the subterranean formation. Generally, the conductivity data is expressed as a curve showing decrease in conductivity with increase in closure pressure. For the purposes of this invention, the conductivity test procedures and apparatus used to test the conductivity in millidarcies/foot are those recommend by the American Petroleum Institute in *API Recommended Practices for Evaluating Short Term Proppant Pack Conductivity*, submittal draft, February 1989. Although not formally approved by the API, these procedures are well known and used by persons skilled in the art.

Generally, the procedure uses deionized or distilled water as the test fluid at ambient temperature (75° F.). A predetermined amount of proppant (based on mass per unit area of two pounds per square feet) is loaded into the cell and leveled with a blade device. The top piston is placed in position, and the unit is placed in a hydraulic press for testing. A closure stress is applied across a test cell for sufficient time to allow the proppant sample bed to reach a semi-steady state. The recommended test parameters for sand and high strength proppants are set forth in Table II.

TABLE II

RECOMMENDED TEST PARAMETERS

| CLOSURE STRESS, psi | FLOW RATES, $cm^3$/min. | | | TIME AT STRESS, hr. |
|---|---|---|---|---|
| A. Sand Proppants (20/40 mesh) | | | | |
| 1,000 | 2.5, | 5.0, | 10.0 | 0.25 |
| 2,000 | 2.5, | 5.0, | 10.0 | 0.25 |
| 4,000 | 2.5, | 5.0, | 10.0 | 1.00 |
| 6,000 | 1.25, | 2.5, | 5.0 | 1.00 |
| 8,000 | 1.0, | 2.0, | 4.0 | 1.00 |
| 10,000 | 1.0, | 2.0, | 4.0 | 1.00 |
| B. High Strength Proppants (All Sizes) | | | | |
| 1,000 | 2.5, | 5.0, | 10.0 | 0.25 |
| 2,000 | 2.5, | 5.0, | 10.0 | 0.25 |
| 4,000 | 2.5, | 5.0, | 10.0 | 0.25 |
| 6,000 | 2.5, | 5.0, | 10.0 | 0.25 |
| 8,000 | 2.5, | 5.0, | 10.0 | 0.25 |
| 10,000 | 2.5, | 5.0, | 10.0 | 0.25 |
| 12,000 | 2.5, | 5.0, | 10.0 | 0.25 |
| 14,000 | 2.5, | 5.0, | 10.0 | 0.25 |

Note:
Use a maximum loading rate of 500 psi/minute to achieve closure stress level. The closure stress is equal to the stress applied to the conductivity test unit minus the pore pressure of the test fluid pressure.

As an example of this invention, when lightweight aggregate having about a 20% alumina content is mixed with kaolin clay having a 40% alumina content in approximately equal parts, the resulting mixture has an alumina content of 25% and a specific gravity of 2.4. Good results have been obtained from a mixture of clay and aggregate in a ratio of about 1:1 when the clay and aggregate were composed as follows:

TABLE III (Typical Analysis of Ingredients)

| | Clay | Aggregate | Mixture |
|---|---|---|---|
| $Al_2O_3$ | 39.3 | 20.6 | 25.9 |
| $SiO_2$ | 54.6 | 64.6 | 62.5 |
| $Fe_2O_3$ | 1.6 | 6.6 | 4.6 |
| $TiO_2$ | 2.6 | 0 | 1.7 |
| MgO | 0 | 2.9 | 1.4 |
| $CaCO_3$ | 1.9 | 0 | 1.0 |
| Others | 0 | 5.3 | 2.9 |

The calcined kaolin clay and the calcined lightweight aggregate in Table III were obtained from Stauffer Mineral Company and Big River Industries, respectively.

When kaolin clay having an alumina content of about 40% is used alone, it is ground to a particle size of approximately ten microns prior to formation of the pellets. When the clay has an alumina content of about 25% or when a mixture of clay and lightweight aggregate having an alumina content of about 25% is used, it is ground to a particle size of approximately three microns, prior to formation of the pellets. By grinding the particles to a smaller particle size, the strength of the proppant can be maintained even though the alumina content is decreased. This grinding process is preferably performed after the material is calcined at about 1,000° C. to drive off most of the free moisture and water of hydration.

Various methods of pellet formation can be used, but the method that is preferred is generally described in U.S. Pat. No. 4,427,068 and involves using an Eirich mixer. The ground, calcined material is mixed with small amounts of binder and water. Additional dry milled clay powder is then added and mixing continues, forming spherical pellets. Dry powder is continually added until the desired size of green pellets is reached. The green pellets are then sintered at 1,100° C. to 1,300° C. for about 45 minutes in a rotary kiln. This results in a spherical ceramic pellet with specific gravity of 2.20 to 2.60 depending generally on the alumina content. The preferred binder of this invention is starch, but any binder which adequately holds the unfired pellet together and does not adversely effect the strength of the fired pellet will suffice. Another possible method of forming the pellets of this invention is described in U.S. Pat. No. 4,522,731 using a spray pelletizer or fluidizer.

Figure 2:
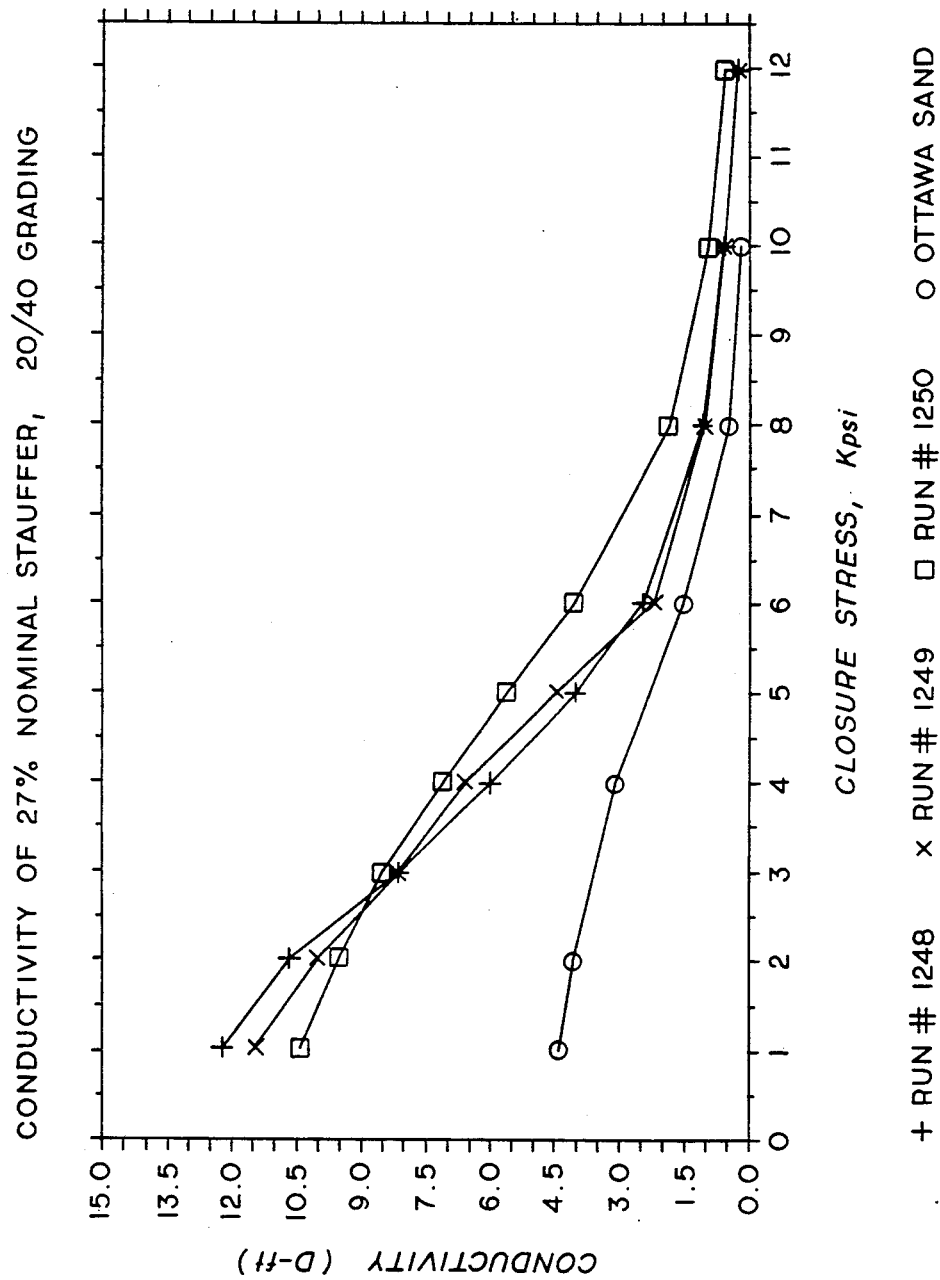
FIG. 2 is a plot of conductivity versus closure stress for samples of the proppant of the present invention.

As previously stated, the proppant of the present invention can also be made from kaolin clay without mixing it with lightweight aggregate if the clay has an alumina content ranging between 25% and 40%. The methods of manufacture are the same as mentioned above. FIGS. 1 and 2 show conductivity versus closure stress for two samples of the clay having alumina contents of 37% and 27%, without lightweight aggregate. These materials were obtained from Stauffer Mineral Company.

It can be seen in FIG. 1 that pellets made from clay having 37% alumina exhibited conductivity higher than that of sand at closure stresses up to 10,000 psi. FIG. 2 shows similar results for pellets made from clay having 27% alumina content although the conductivity of these pellets at various pressures is slightly less than the conductivity of the pellets having 37% alumina content. FIG. 3 summarizes the results shown in FIG. 1 and FIG. 2 and also shows, for comparison purposes, the conductivity of a low density/intermediate strength proppant made according to U.S. Pat. No. 4,412,731 (Lunghofer). Based on this data, lightweight proppants having an alumina content of from 25% to 40% would have conductivity greater than sand at closure stress up to 8,000 psi. Use of the proppants of this invention is suited for low to intermediate well depths, i.e., 5,000 to 10,000 feet, and is especially suited for well depths up to about 8,000 feet.

It will be obvious to those skilled in the art that the invention described here can be essentially duplicated by making minor changes in the material content or the method of manufacture. To the extent that such materials or methods are substantially equivalent, it is intended that they be encompassed by the following claims.

It is claimed:

1. A method of fracturing a subterranean formation having a closure stress less than 8,000 psi which comprises injecting a hydraulic fluid into the formation at a rate and pressure sufficient to open a fracture therein, injecting into said fracture a fluid containing sintered, spherical pellets having an alumina content of between 25% and 40% distributed homogeneously throughout said pellets, a specific gravity of between 2.20 and 2.60 and a conductivity greater than the conductivity of sand.

2. The method of claim 1, wherein the pellets are prepared from kaolin clay.

3. The method of claim 1, wherein the pellets are prepared from a mixture of kaolin clay and lightweight aggregate.

4. A method of fracturing a subterranean formation having a closure stress less than 8,000 psi which comprises injecting a hydraulic fluid into the formation at a rate and pressure sufficient to open a feature therein, injecting into said fracture a fluid containing sintered, spherical pellets, said pellets comprising silicon dioxide and alumina, having an alumina content of between 25% and 40% distributed homogeneously throughout said pellets, a ratio of silicon dioxide to alumina content of from about 1.39 to about 2.41, a specific gravity of between 2.20 and 2.60 and a conductivity greater than the conductivity of sand.

* * * * *